April 10, 1951 L. A. VASSAKOS 2,548,180

AUTOMATIC VARIABLE FEED ATTACHMENT FOR SHAPERS

Filed March 26, 1945 12 Sheets-Sheet 1

INVENTOR.
LEONIDAS A. VASSAKOS.
BY
*Seree Freeman*
ATTORNEY.

INVENTOR.
LEONIDAS A. VASSAKOS.
BY Percy Freeman
ATTORNEY.

INVENTOR.
LEONIDAS A. VASSAKOS.
ATTORNEY.

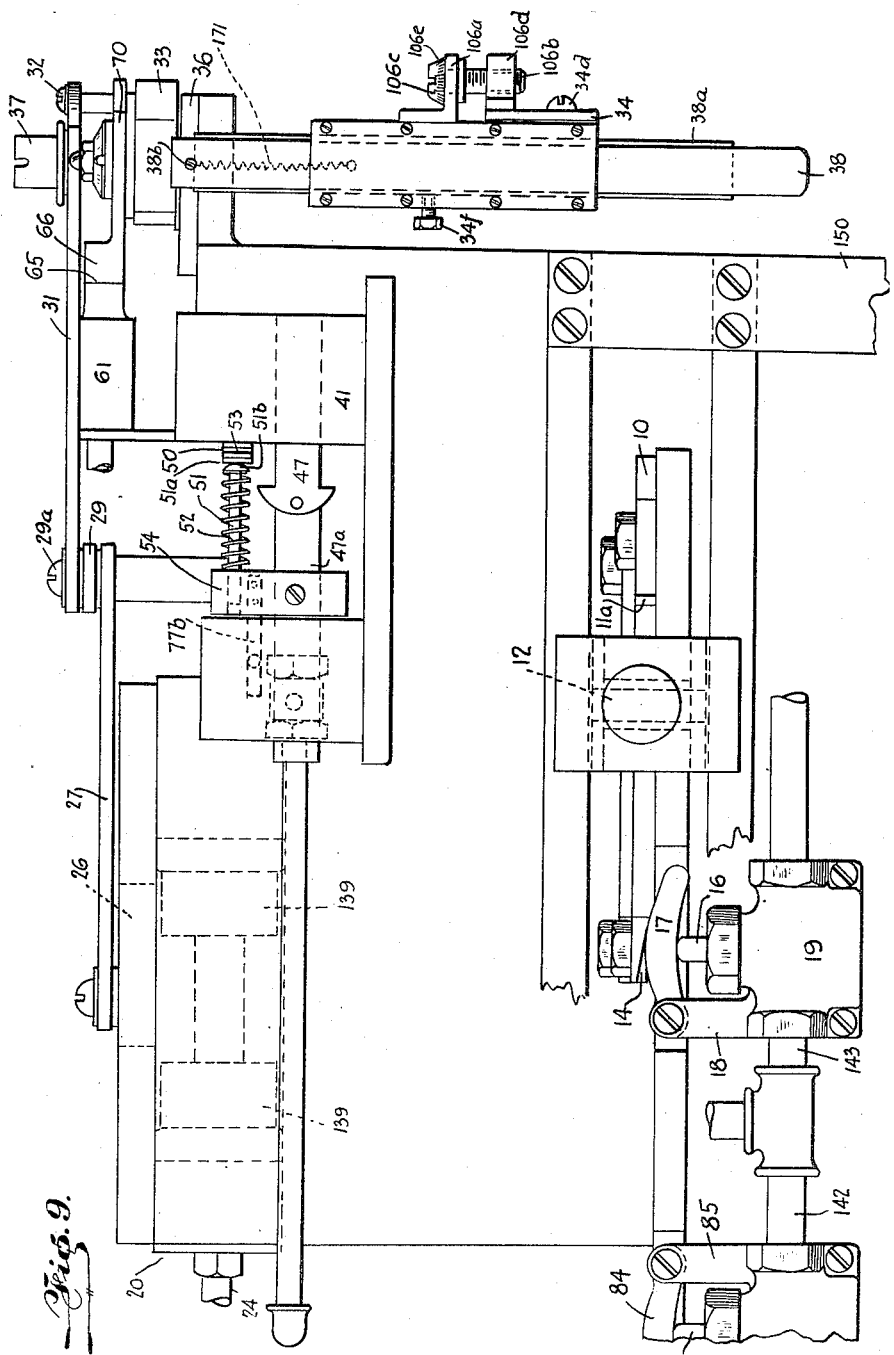

April 10, 1951     L. A. VASSAKOS     2,548,180
AUTOMATIC VARIABLE FEED ATTACHMENT FOR SHAPERS
Filed March 26, 1945     12 Sheets-Sheet 6
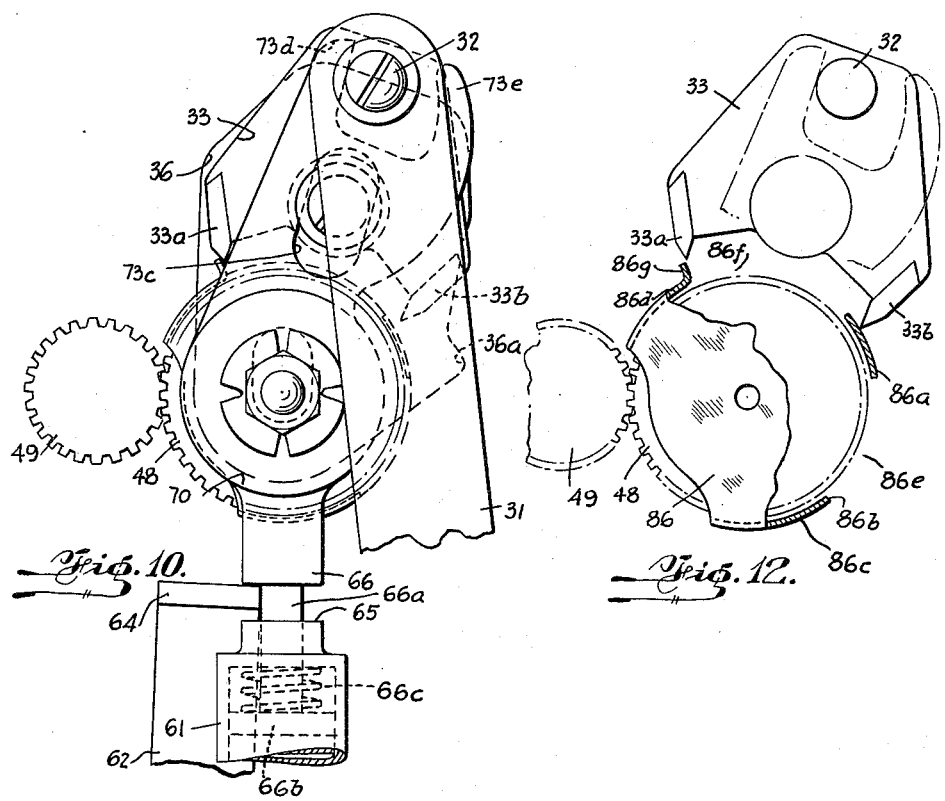
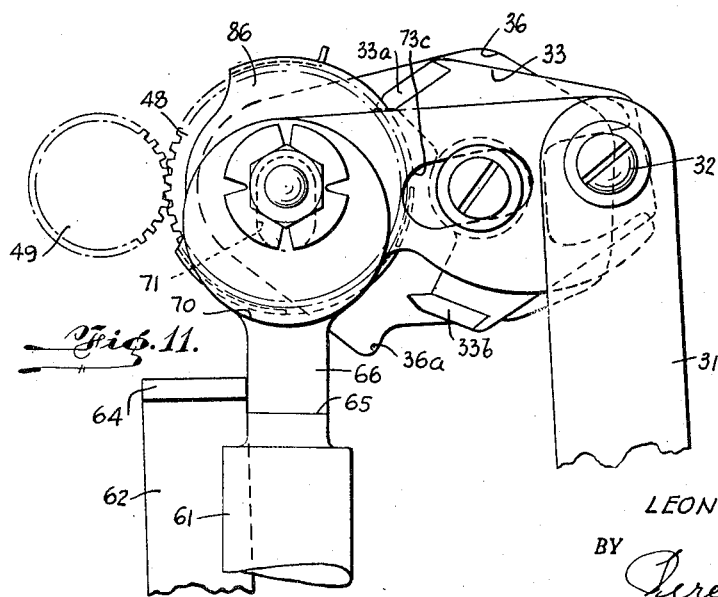
INVENTOR.
LEONIDAS A. VASSAKOS.
BY Percy Freeman
ATTORNEY.

April 10, 1951      L. A. VASSAKOS      2,548,180
AUTOMATIC VARIABLE FEED ATTACHMENT FOR SHAPERS
Filed March 26, 1945      12 Sheets-Sheet 7

INVENTOR.
LEONIDAS A. VASSAKOS,
BY Percy Freeman
ATTORNEY.

April 10, 1951  L. A. VASSAKOS  2,548,180
AUTOMATIC VARIABLE FEED ATTACHMENT FOR SHAPERS
Filed March 26, 1945  12 Sheets-Sheet 8
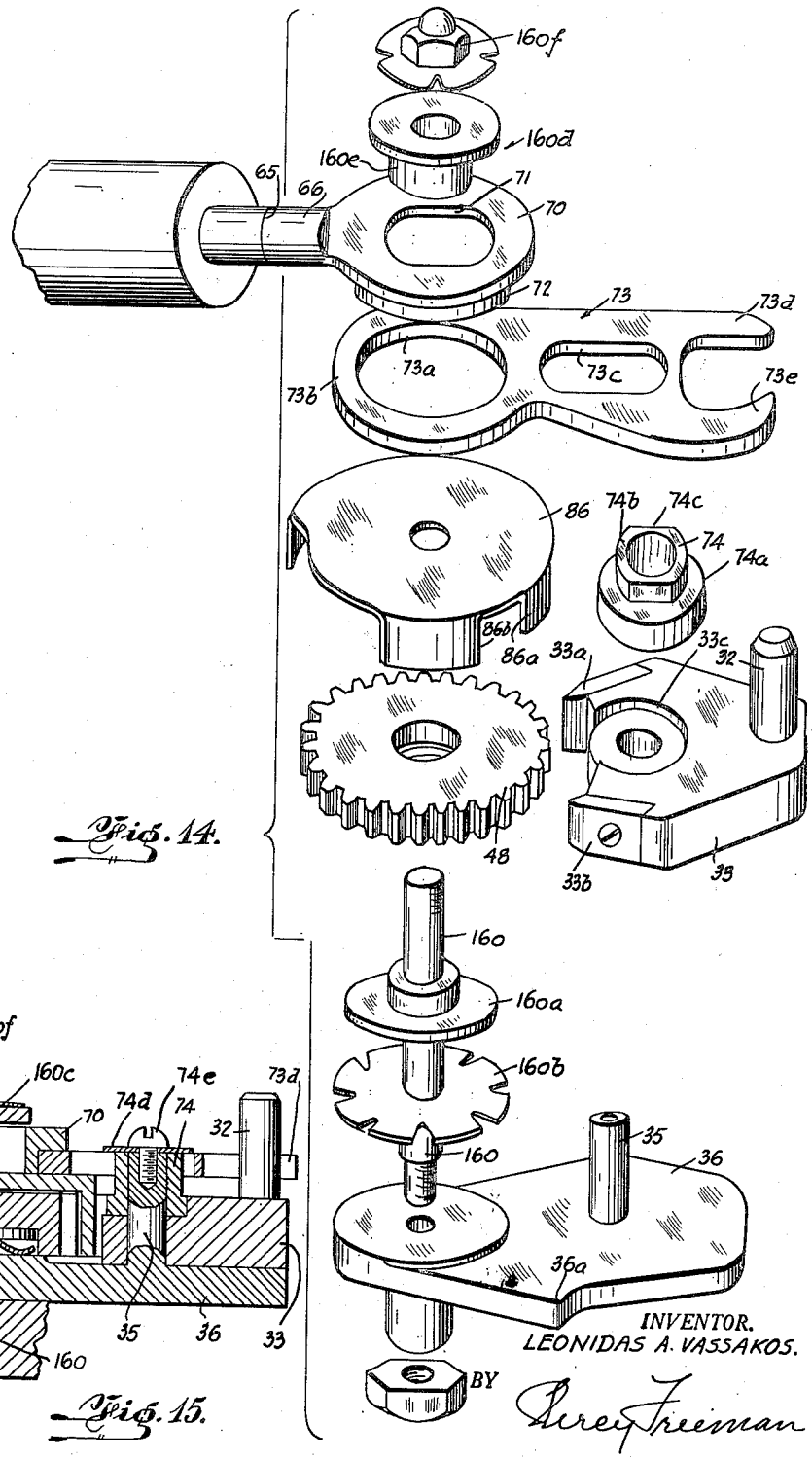
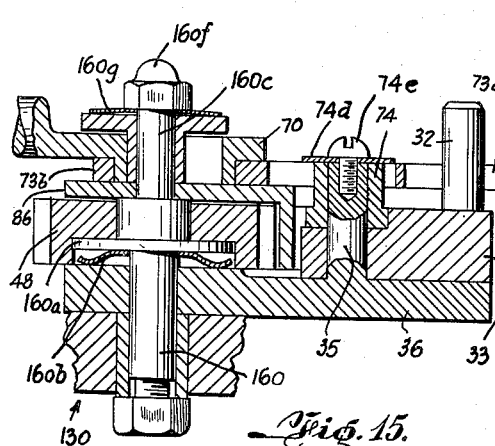
INVENTOR.
LEONIDAS A. VASSAKOS.
BY Percy Freeman
ATTORNEY.

April 10, 1951 — L. A. VASSAKOS — 2,548,180
AUTOMATIC VARIABLE FEED ATTACHMENT FOR SHAPERS
Filed March 26, 1945 — 12 Sheets-Sheet 9
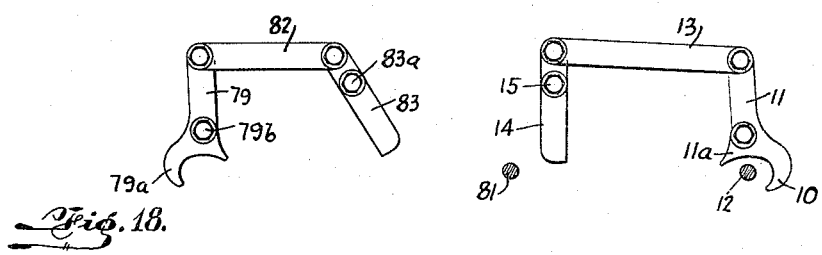
Fig. 18.
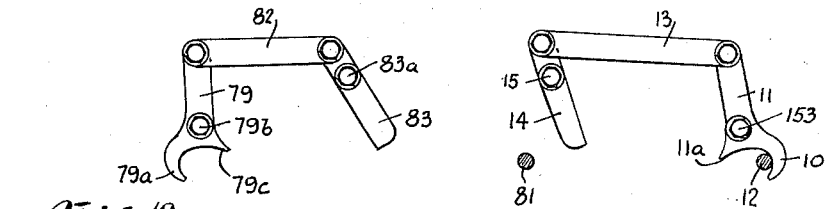
Fig. 19.
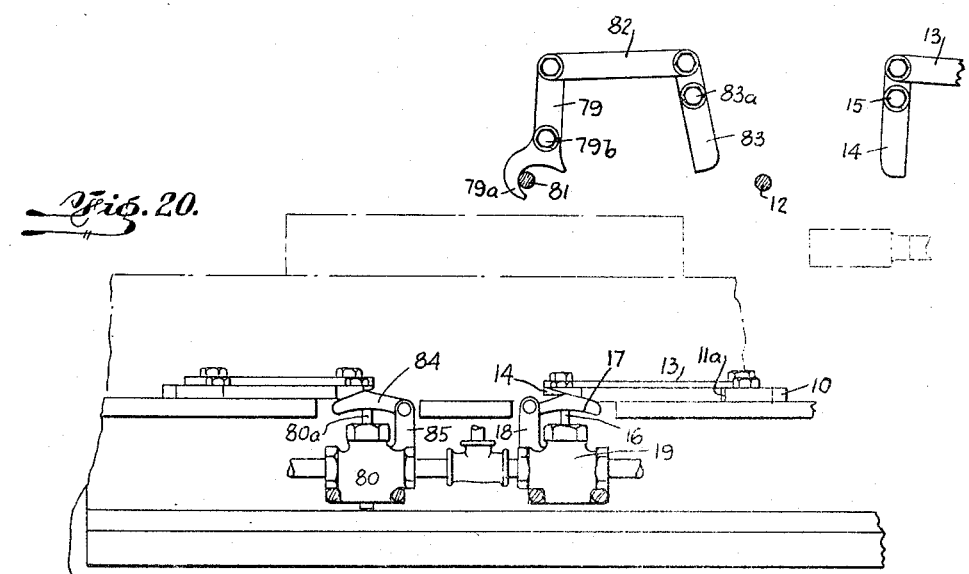
Fig. 20.
Fig. 21.
INVENTOR.
LEONIDAS A. VASSAKOS.
BY Percy Freeman
ATTORNEY.

INVENTOR.
LEONIDAS A. VASSAKOS.

April 10, 1951 L. A. VASSAKOS 2,548,180
AUTOMATIC VARIABLE FEED ATTACHMENT FOR SHAPERS
Filed March 26, 1945 12 Sheets-Sheet 11
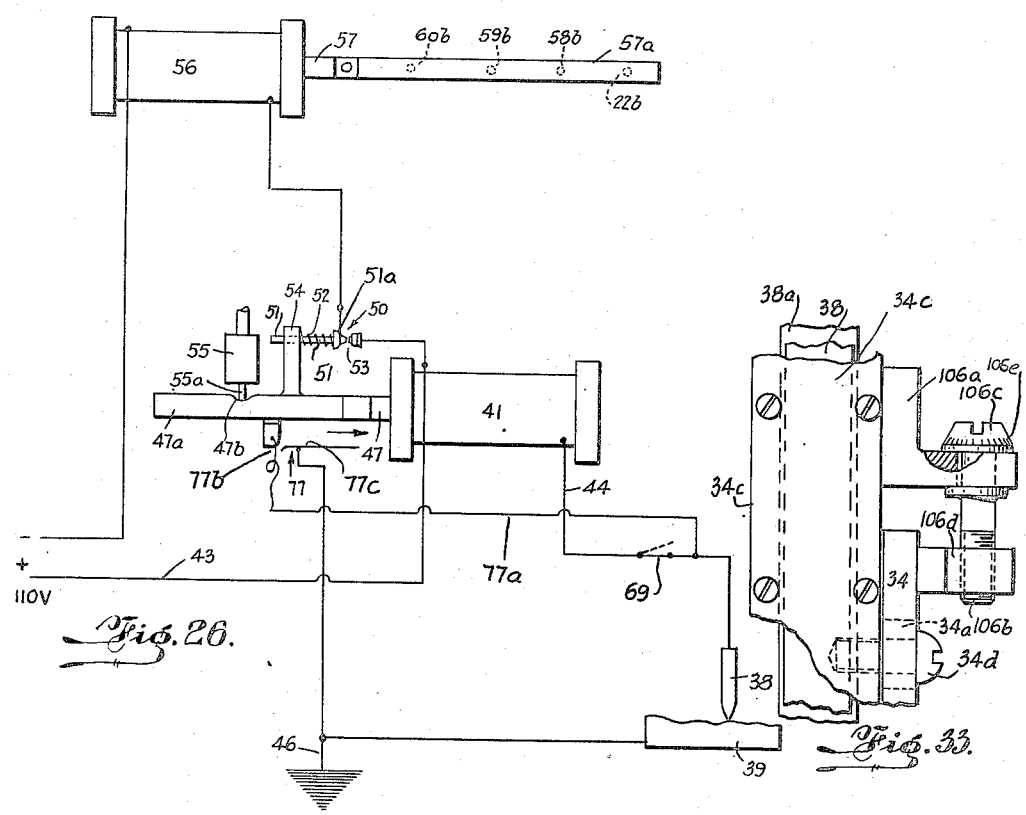
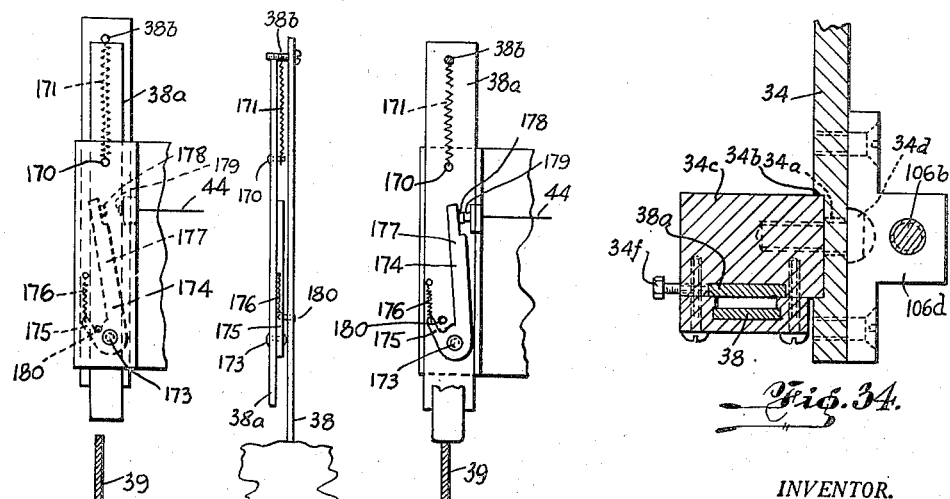
INVENTOR.
LEONIDAS A. VASSAKOS.
BY
Percy Freeman
ATTORNEY.

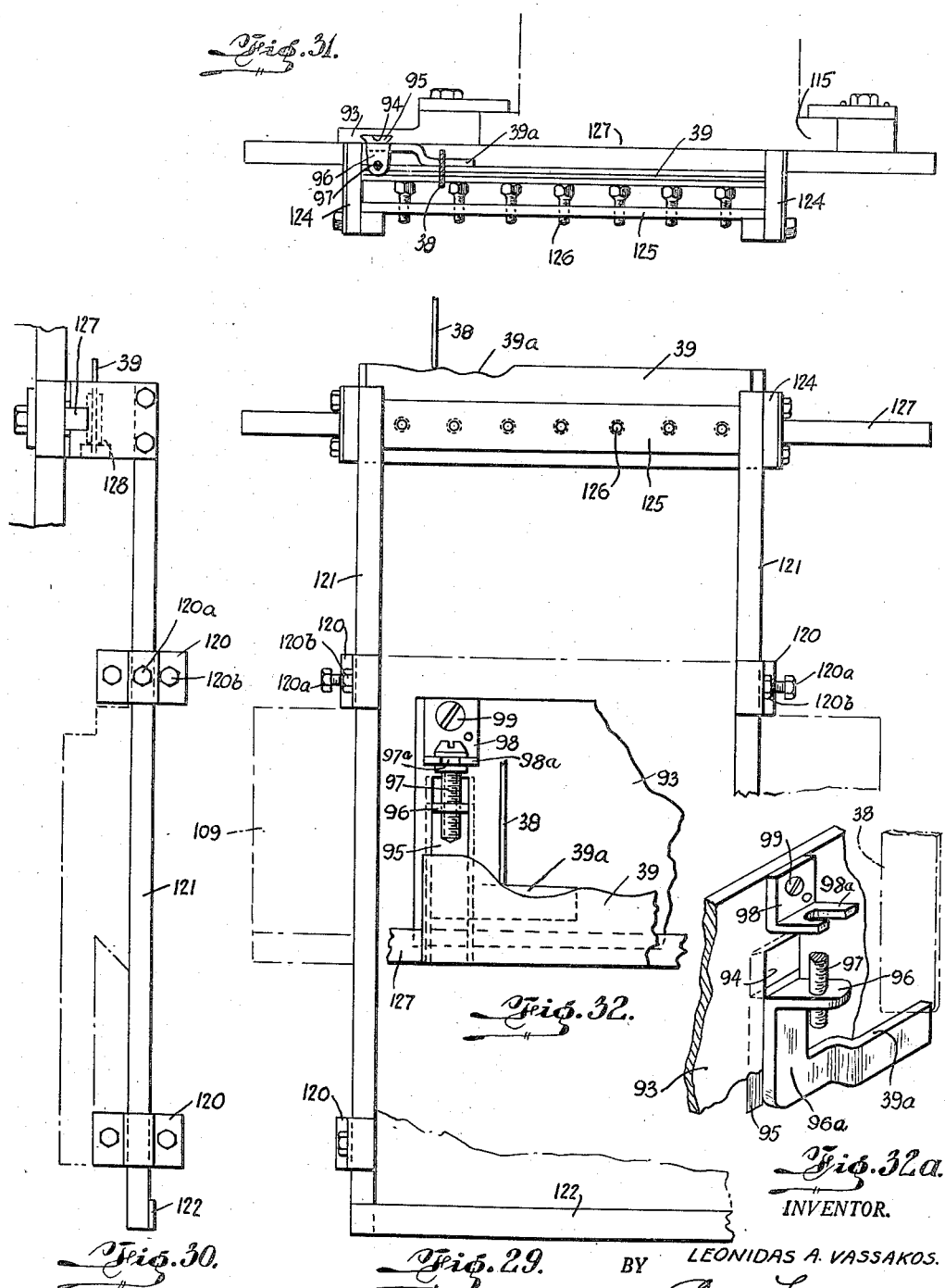

Patented Apr. 10, 1951

2,548,180

UNITED STATES PATENT OFFICE 2,548,180

AUTOMATIC VARIABLE FEED ATTACHMENT FOR SHAPERS

Leonidas A. Vassakos, New York, N. Y., assignor of one-third to Charles Rosenthal, Teaneck, N. J., and one-third to Alfred Gurkin, Bronx, N. Y.

Application March 26, 1945, Serial No. 584,843

13 Claims. (Cl. 90—24.3)

This invention relates to machine tools. It is particularly directed to a machine tool such as a shaper, planer, or the like machine.

An object of this invention is to provide a machine tool of the character described having means to finish machining the work in accordance with a template.

Another object of this invention is to provide a shaper comprising a work-holding table and a tool for cutting the work, the table and the tool having relative reciprocating movement and relative transverse adjustment in increments, a profile template being attached to the table, and means associated with the cutting tool to cooperate with the template for cutting the work piece in accordance with the shape of the template.

Yet another object of this invention is to provide a shaper of the character described having a work table and a profile template fixed thereto and means on the reciprocating head which carries the cutting tool, and controlled by said template, for feeding the cutting tool downwardly to cutting position prior to the forward or cutting stroke of the head, and to raise the tool a predetermined distance prior to retracting said head.

A further object of this invention is to provide in a machine of the character described means to raise the tool a predetermined fixed and constant amount, and means to lower the tool a predetermined maximum amount but not in excess of the distance necessary for the follower to touch the template on the work table, the arrangement being such that the elevation or retraction of the tool is less than the maximum projection or downward feeding movement of the tool.

Still another object of this invention is to provide in a machine of the character described electrical means controlled by a template on the work table for operating valves to control operation of a piston in a cylinder, which piston in turn controls movement of the cutting tool toward and away from the work.

A still further object of this invention is to provide in a machine of the character described a cylinder on the slide head, a piston in the cylinder, a gear on the feed screw mechanism, another gear meshing therewith, a double-toothed dog adapted to selectively engage the second gear, links and levers connecting the piston with the dog, means controlled by the template on the work table to admit air to one end of the cylinder for moving the piston in a direction for actuating the dog to engage a tooth of the dog with the second gear for rotating the feed screw mechanism in a direction for feeding the tool downwardly, the arrangement being such that when the follower touches the template, air will momentarily be allowed to enter the opposite end of the cylinder to give the piston a kick for releasing from said gear the tooth which engages the second gear, and then permit the piston to continue its movement in the cylinder so that the dog can continue its movement without rotating the second gear.

Yet a further object of this invention is to provide a strong, rugged and durable machine of the character described which shall be relatively inexpensive to manufacture, sure, positive and accurate in operation, and yet practical and efficient to a high degree in use.

A further object is to provide a device of this character which may be constructed as a component part of a shaper or planer, or as an attachment therefor.

A further object is to provide an attachment of this character which will in no way affect the use of the shaper or planer in the standard conventional manner, when so desired.

Other objects of this invention will in part be obvious and in part hereinafter pointed out.

The invention accordingly consists in the features of construction, combination of elements, and arrangement of parts which will be exemplified in the construction hereinafter described, and of which the scope of application will be indicated in the following claims.

In the accompanying drawing, in which is shown various possible illustrative embodiments of this invention:

Fig. 9 is a partial side elevational view of the machine embodying the invention, showing the main valves and the piston for controlling the cutting tool.

Fig. 10 is a partial top plan view of the control means for moving the cutting tool and showing the same in a position where the head has been fully retracted and the cutting tool has been moved down until the control member contacted the profile cam on the work table.

Fig. 11 is a view similar to Fig. 10 but showing the position of the parts just as the cutting tool is being lowered.

Fig. 12 is a top plan view of the structure shown in Fig. 10 with some of the elements removed.

Fig. 14 is an expanded perspective view of the ratchet assembly.

Fig. 15 is an elevational cross-sectional view through the ratchet assembly.

Fig. 18 is a side elevational view illustrating the means for controlling the main valves and showing the position of the parts as the head is being retracted.

Fig. 19 is a view similar to Fig. 18 but showing the position of the parts when the head is fully retracted so that one of the main valves is open.

Fig. 20 is a view similar to Fig. 19 but showing the position of the parts when the head is in its fully forward position thereby actuating the other main valve.

Fig. 21 is a side elevational view illustrating the main valves and controls therefor.

Fig. 26 is a diagrammatic view illustrating the electrical hook-up for controlling the valves.

Fig. 27 is a vertical view of the control member illustrating a modified construction and showing the switch open.

Fig. 28 is a view similar to Fig. 27 and showing the position when the switch is closed.

Fig. 28a is a side elevation of the modification shown in Figs. 27 and 28.

Fig. 29 is a partial front view of the machine illustrating the means for supporting the profile template on the machine.

Fig. 30 is a side view of the structure shown in Fig. 29.

Fig. 31 is a top plan view of the structure shown in Fig. 29.

Fig. 32 is a fragmentary elevational view showing the profile template, the false template, the follower, and the adjusting means for the false template.

Fig. 32a is a fragmentary perspective view showing the construction of the false template or masking member and details of its supporting means.

Fig. 33 is a side elevational view showing details of the adjusting means for the follower.

Fig. 34 is a cross-sectional view of the follower construction shown in Fig. 33.

Figure 1:
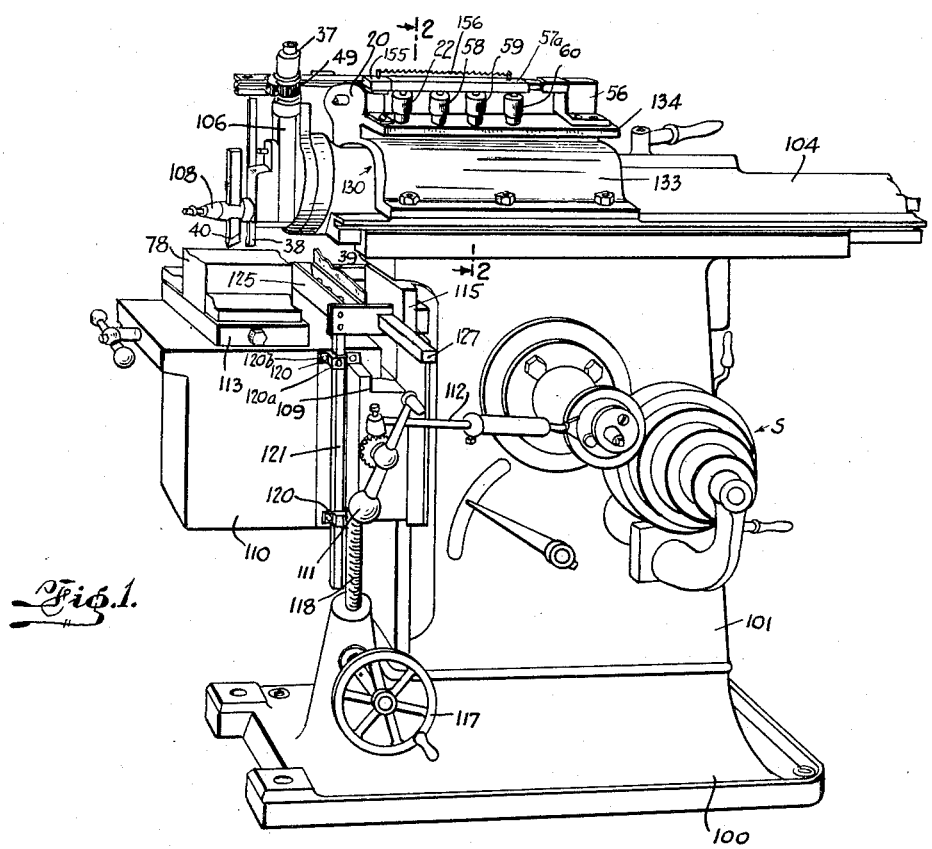
Fig. 1 is a perspective view of a machine embodying the invention here shown for the purpose of illustration in the form of a shaper.

Referring now in detail to the drawing (Figs. 1 and 2), S indicates a machine tool embodying the invention, here shown for the purpose of illustration in the form of a shaper. The shaper S comprises a base 100 supporting a body 101. The body 101 has a top horizontal wall 102 formed with a longitudinal slot to provide inner guide edges 103 to support the sliding or reciprocating head 104. The head 104 may be of usual construction except as modified in accordance with the description hereinafter contained.

On the body are usual means for reciprocating the head, and for adjusting the length of the stroke. At the front end of the head is a usual tool support 106 comprising a tool feed screw mechanism 37 for the shaper tool post 108. On the tool post 108 is tool 40. When the screw mechanism 37 is rotated the tool post will be moved up or down depending upon the direction of rotation. On the body 101 is a work table support 109 on which there is supported for sliding movement the work table 110.

The usual means are provided for moving the work table transversely either by means of hand lever 111 or by the ratchet mechanism 112 well known in the art.

On the work table 110 is a vise 113 to support the work piece 78. The work piece may be rough cut first, and the present invention may be used to provide means for fine or finish cutting the work piece, though means are provided to enable the complete cutting of the work in duplication of a template, as will later appear. The support 109 can be adjusted vertically in the usual manner. To this end the support 109 is supported for vertical sliding movement on a vertical slide 115. On the base is a wheel 117 connected through proper gearing to a vertical screw 118 which controls the vertical movement of the support 109.

Attached to the work table 110 in the manner hereinafter described is a transverse profile template 39 (Figs. 1, 4, 26–30, 32). The purpose of the machine is to cut the work piece 78 in accordance with the shape of the template 39. The template 39 is a plate having an edge at its upper end shaped to the contour intended for the cross-section of the finished work. Attached to the sides of the work table as by studs 120b (Figs. 1, 4, 29, 30) are spaced brackets 120. Slidably supported by the brackets are vertical frame members 121. The lower ends of said frame members are interconnected at the bottom by a brace member 122. Attached to the upper ends of the vertical members 121 are side brackets 124 (Figs. 29, 30, 31). Interconnecting the upper ends of frame members 121 is a transverse bar 125 formed with a plurality of screw-threaded openings in which are screwed studs 126 thus providing a vise for the templates 39. The rear ends of the brackets 124 are slidable along a transverse bar 127 which is securely clamped to the vertical slide 115 as shown at 115a. The template 39 has protecting plates 128 on opposite sides thereof as seen in Fig. 30. One plate slidably contacts the bar 127. The other plate is contacted by the heads of the screws or studs 126. The studs thus press the template between the protecting plates 128 to fix the template against movement. The template may be removed by loosening the screws or studs 126 of the vise. The template is formed with an edge 39a adjacent one end and having the shape intended for the finished work. The work table 110 and hence the work 78 may be properly positioned relative to the template 39 by raising the table 110 or lowering it. The studs 120a may then be screwed tightly against the frame members 121.

Now obviously the "bite" of the tool is limited. Hence, unless the work were first rough cut to approximate the shape of the template, some means must be provided to arrest the tool from moving down beyond the limit of the "bite" possible and feasible with the particular work in hand. Hence means are provided as, for instance, the false template or arrestor 39a (Fig. 32), to arrest the follower and hence the tool when it has been moved or fed downwardly sufficiently to take the required "bite."

Secured to the bar 127 (Figs. 31, 32, 32a) is a plate 93 the front face of which is provided with a dovetail slide groove 94 within which is slidably received a complementary slide 95 to which is secured a bracket 96a. This bracket has a right angled portion 96 which is bored and tapped to threadedly receive stud 97 which is rotatably supported by bracket 98 which in turn is secured to plate 93 as by screw 99. The stud 97 has an enlarged head which is provided with an annular groove 97a (Fig. 32). The horizontal leg of bracket 98 is bifurcated and the grooved head of stud 97 is received between the furcations 98a to be rotatably retained therebetween. Extending laterally from the bracket 96a is a false template or arrestor 39a. The top of the enlarged head of stud 97 is slotted to receive a screw driver. It will thus be seen that by rotating stud 97 the false template or arrestor 39a may be raised or lowered relative to the template 39.

Attached to the head 104 is a casting 130. Casting 130 has flanges 131 resting on the head and attached thereto by bolts 132. Said casting furthermore has a curved wall 133 straddling the head. Above wall 133 is a horizontal shelf 134 and a cylinder 20. At the ends of the cylinder 20 are plugs 20a and 20b (Figs. 8, 13, 22–25). Attached to plug 20a is a pipe 24 (Figs. 22–25) and attached to plug 20b is a pipe 136. Within cylinder 20 is a reciprocating piston 137 comprising a pair of spaced heads 138 and 139 having a wiping engagement with the internal surface of the cylinder. The cylinder is formed with a slot 26 (Fig. 13) between the piston heads. Connected to the piston is an arm 25 extending through the slot 26 for the purpose hereinafter appearing.

Means is provided to control the action of the piston 137. To this end there is mounted on shelf 134 (Figs. 5, 6, 7, 22–24) a series of spaced control valves designated by numerals 22, 58, 59 and 60 provided with valve stems 22a, 58a, 59a and 60a, respectively. When the valve stems are normally up, the valves are closed. When the valve stems are depressed the valves open to permit passage of air therethrough. Valve 59, however, is a two-way valve which can be opened to permit air to pass therethrough, and when it is closed, the inlet end thereof is shut whereas its outlet end is opened to discharge to the atmosphere. Attached to one side of member 130 as in Figs. 9, 21, 22, 23, 24, in the manner hereinafter described, are a pair of main valves 80 and 19. When said valves are opened, air may pass therethrough. When said valves are closed air supplied to the inlet sides of the valves is shut off and the outlet sides of the valves are opened to discharge to the atmosphere.

An exhaust valve 55 is furthermore supplied as will appear hereinafter.

There is furthermore provided a cylinder 61 (Figs. 8, 10, 11, 16, 22–25) in which a piston 66b slides. When air under pressure is supplied to the cylinder 61 the piston 66b is moved forwardly. When supply of air to the cylinder is cut off the piston will be retracted (unless restrained) by a spring 66c Fig. 10 in the cylinder 61. The supply of air under pressure is provided through tank 140. The tank 140 (Figs. 22–25) is connected through pipe 141 to branch pipes 142 and 143 which are connected to the inlet ends of the main valves 19 and 80. The outlet side of main valve 19 is connected through pipe 21 to valve 22. Valve 22 is connected through pipe 23 to pipe 24. Pipes 23 and 24 are connected through pipe 144 to the exhaust valve 55. Pipe 141 is connected through pipe 145 to valve 58. Valve 58 is connected by pipe 146 to said pipe 136 which in turn is connected to the plug 20b. Pipe 145 is connected through pipe 147 to the inlet end of valve 59. The outlet end of valve 59 is connected by pipe 148 to said cylinder 61. The outlet end of main valve 80 is connected by pipe 149 to valve 60. Valve 60 is connected by pipe 150 to the junction of pipes 146 and 136.

Figure 2:
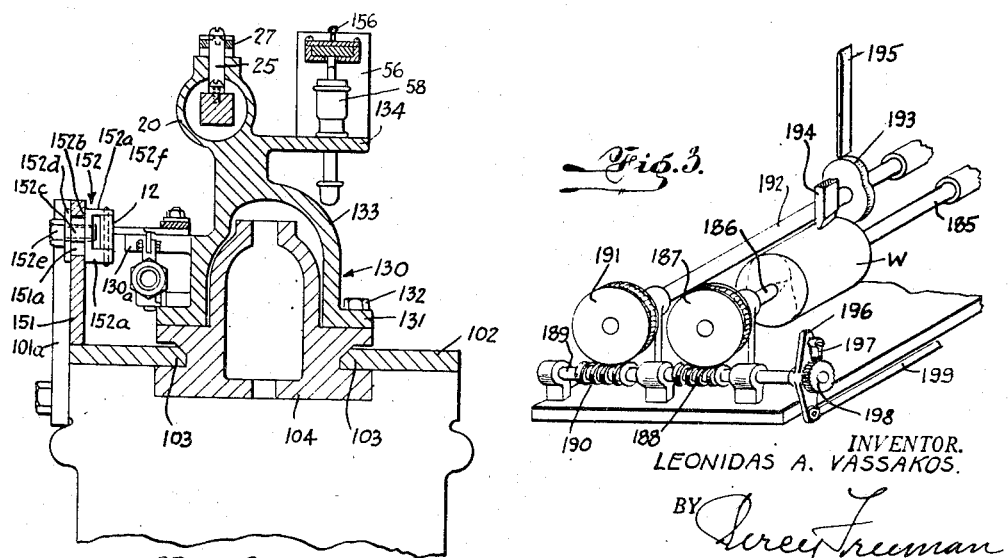
Fig. 2 is a cross-sectional view taken through the upper part of Fig. 1.

Means is provided to control the valves 19 and 80. To this end there is fixed to the body 101 a vertical bracket 101a (Fig. 2). Attached to bracket 101a is a vertical plate 151. Mounted on the plate 151 are a pair of bifurcated brackets 152 carrying vertical rollers 12 and 81, respectively (see Figs. 2, 9, 18–21). Each bifurcated bracket 152 has top and bottom arms 152a and a vertical arm 152b. Attached to each of the vertical arms 152b is a stud 152c. The studs 152c pass through horizontal, longitudinal slots 151a. On the studs are washers 152d contacting plate 151. Screwed to the studs are nuts 152e. The rollers 12 and 81 are rotatably mounted on vertical pins 152f supported on arms 152a of the brackets.

It will now be understood that the longitudinal position of the roller 12 may be adjusted depending upon the stroke of the head 104.

Member 130 is provided with a horizontal wall 130a (Fig. 2). Pivoted to wall 130a as at 153 (Figs. 18, 19, 21) is a lever 11 having a hook 10 at one end of a finger 11a spaced from the hook 10. Pivoted to the wall 130a as at 15 is a lever 14. Interconnecting one end of lever 14 with an end of lever 11 is a link 13. When the head 104 is being retracted as it approaches the end of its return stroke, roller 12 will engage hook 10 to rotate lever 11 which in turn rotates lever 14 through the link 13. On the body of valve 19 is a bracket 18 (Figs. 9 and 21). Pivoted to the bracket is an arm 17 overlying the valve stem 16 of said valve 19. When lever 14 is rotated in a counterclockwise direction looking at Fig. 19, the end of the lever will engage pivot arm 17 to depress the valve stem 16 for opening valve 19. As the head begins to move in an opposite direction for the cutting stroke, roller 12 will engage the finger 11a to move the levers to normal position for closing the valve 19. There is also pivoted to wall 130 as seen in Figs. 18, 19, 20, a lever 79 pivoted thereto as at 79b. Lever 79 at one end is provided with a hook 79a and with a finger 79c, spaced from the hook. Pivoted to said wall as at 83a is a lever 83. One end of lever 83 is connected to lever 79 by a link 82. As the head of the shaper approaches the end of its cutting stroke, roller 81 will engage finger 79 to rotate lever 83 in a clockwise direction. On valve 80 is an upstanding bracket 85 (Figs. 9, 21). Pivoted thereto as an arm 84 overlying the valve stem 80a of said valve. When lever 83 is moved in a clockwise direction it will engage arm 84 to depress the valve stem 80a and open valve 80. When the head begins its return movement roller 81 will kick finger 79c to move the lever 83 off arm 84 so as to permit the valve 80 to close at its inlet end and open to the atmosphere at its outlet end.

Figure 5:
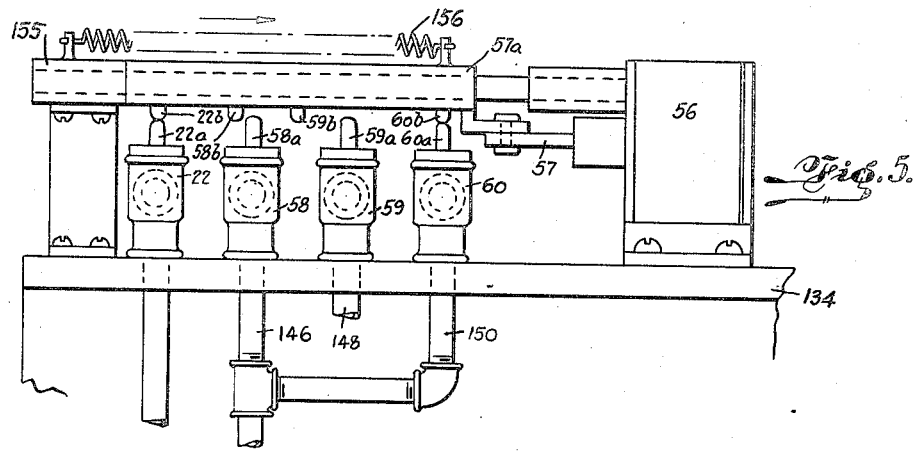
Fig. 5 is a side elevational view illustrating air valves and the control therefor and showing the position of the valves when the machine head is being retracted, and before the valve control member is actuated.
Figure 6:
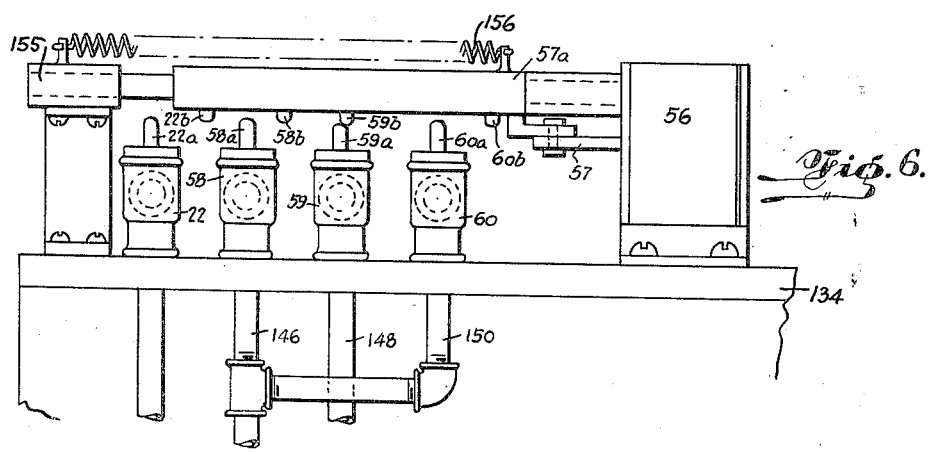
Fig. 6 is a view similar to Fig. 5 but showing the position of the parts after the valve actuating member has been fully moved.
Figure 7:
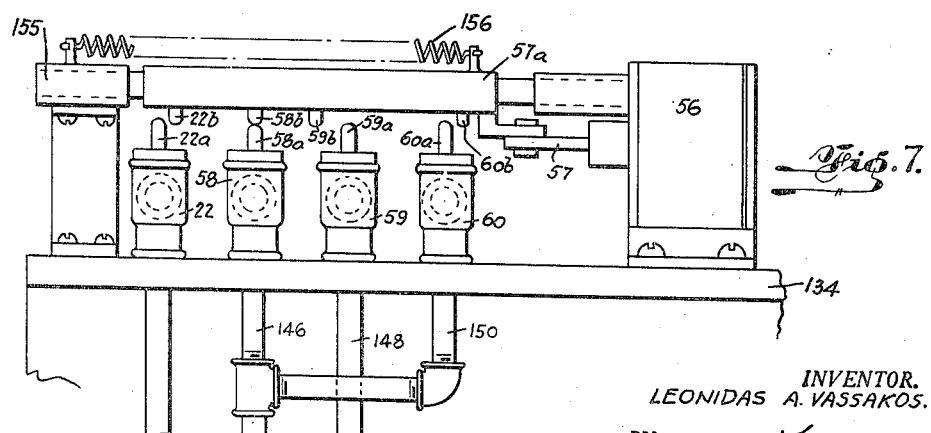
Fig. 7 is a view similar to Fig. 6, but showing an intermediate position between the positions of Figs. 5 and 6.

On shelf 134 is a solenoid 56 (Figs. 1, 5–8, 26). Overlying the valves 22, 58, 59 and 60 is a slide 57a attached to the armature 57 of the solenoid 56. When the solenoid is energized slide 57a moves to the right as shown in Fig. 6. Interconnecting slide 57a with a bracket 155 is a coil tension spring 156. At the underside of the bar 67a are cam lobes 22b, 58b, 59b and 60b, respectively. When the bar is in the position shown in Fig. 5, the lugs 22b and 60b overlie and depress the valve stems 22a and 60a respectively, to keep the valves open. Lug 58b is positioned in advance of the stem 58a. Lug 59b is positioned in advance of valve stem 59a. However, lug 58b is closer to lug 58a than lug 59b is to stem 59a. Thus as the solenoid is energized, and the bar 57a begins to move to the right, the lugs 22b and 60b move off the valve stems 60a to open the valves 22 and 60, respectively. Lug 58b also engages stem 58a to depress the same and open valve 58. This position is shown in Fig. 7 of the drawing.

As the bar continues to move to the right, lug 59b engages stem 59a to open valve 59, and lug 58b moves off stem 58a so that each of the valves 58 and 60 are opened. When the solenoid is de-energized as will appear hereinafter, spring 156 retracts the bar 57a to reverse the sequence of the valves.

Pivoted to the upper end of the stem 25 (Figs. 8, 9, 13, 16) of the piston 137 is a link 27. Said link is pivoted as at 28 to a lever 29. Lever 29 is pivoted at one end 30 to a fixed part of member 130. The opposite end of lever 29 is pivoted as at 29a to one end of the link 31. On the screw feed mechanism 37 (Figs. 1, 4, 8–12) is a gear 49. Gear 49 meshes with a gear 48 rotatably mounted on a vertical stem 160 fixed to member 130 (see Figs. 14 and 15 for details). Pivoted to stem 160 is a plate 36 provided with an upstanding pin 35. Plate 36 is formed with a heel 36a for the purpose hereinafter appearing. Mounted on plate 36 and pivoted to stem or post 35 is a dog 33. Dog 33 is formed with an upstanding pin 32 pivoted to the opposite end of said link 31. The dog 33 is formed with a pair of opposite teeth 33a and 33b adapted to engage the teeth of gear 48 in the manner hereinafter appearing. Dog 33 is provided with an annular countersunk opening 33c. Rotatably mounted therein is a pivot member 74 having an annular flange 74a received within the countersunk opening and provided with an upstanding projection 74b having flattened side edges 74c. Member 74 is rotated on the dog by means of a washer 74d held in place by a screw 74e screwed to the upper end of pin 35. The gear 48 is formed with a countersunk recess on its underside to receive a flange 160a on stem 160. A star spring 160b may be interposed between plate 36 and flange 160a. Overlaying the gear 48 is a cover or guard 86 having downwardly extending skirted flanges 86a, 86c, and 86d (Figs. 12, 14). Between flanges 86a and 86c is a space 86e. The leading edge of flange 86c is indicated by numeral 86b. Flange 86a is separated from flange 86d by a space 86f. At one end of flange 86d is a lip 86g. Cover 86 is formed with a central opening through which the stem passes. On the cover 86 is an arm 73 having at one end an annular portion 73b formed with a central opening 73a larger than the stem. Arm 73 is formed with a longitudinal slot 73c receiving the projection 74b of pivot member 74. The flattened edges 74c of said projection engage the side edges of the slot 73c. At the outer end of arm 73 is a bifurcation forming a tongue 73d and a tine 73e spaced therefrom. Overlying arm 73 is the piston rod 66 formed with a flat extension 70 having on its underside a skirted flange 72 received within the opening 73a. The flattened extension 70 is formed with a slot 71. On the upper end 160c of the stem 160 is an annular washer 160d formed on its underside with a cylindrical sleeve 160e projecting into slot 71. Screwed to the upper end of the stem portion 160c is a cap nut 160f. A star washer 160g may be interposed between the cap nut and the upper portion of member 160d.

It will now be understood that piston rod 66 may be moved in a plane perpendicular to the axis of stem 160 for the purpose of moving or oscillating arm 73 sideways (Figs. 10, 11, 14, 15). Piston rod 66 is connected to a stem 66a projecting into the cylinder 61 and connected to the piston 66b within said cylinder. At one end of the cylinder 61 is a shoulder 65. On stem 66a within the cylinder is strung a coil spring 66c with one end abutting against the piston 66b and the other end bearing against the end wall of the cylinder 61.

When the valve 59 opens and air under pressure enters cylinder 61, the piston 66b will press the stem 66a and the rod 66 forwardly against the tension of spring 66c for moving arm 73. Spring means 66c is provided for retracting the piston rod 66 to move the same into contact with shoulder 65 when valve 59 is closed, thereby cutting off air pressure from cylinder 61 and exhausting the cylinder.

Means is provided, however, to prevent retraction of the piston rod 66 under certain circumstances (see Figs. 8, 10, 11, 16, 17). To this end there is pivoted to member 130 an angle lever 62 having an upstanding finger 64 adapted to move between piston rod 66 and shoulder 65 to prevent retraction of the piston rod. On the underside of lever 62 is a pin 62a (Figs. 8, 17) connected by spring 63 to a fixed post, whereby to normally tend to rotate the lever 62.

Figure 17:
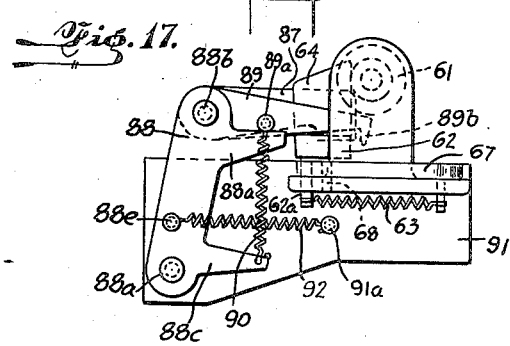
Fig. 17 is an elevational view of a part shown in Fig. 16.
Figure 13:
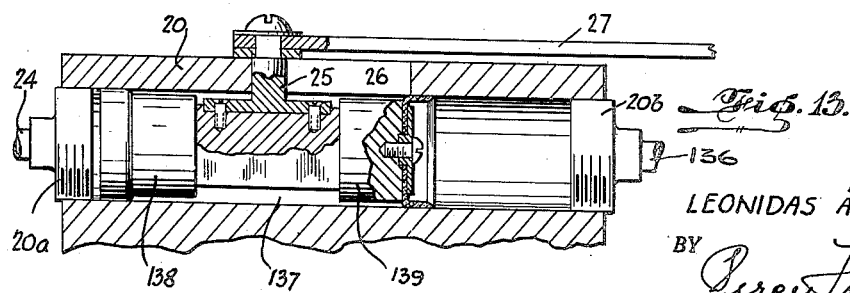
Fig. 13 is a cross-sectional view through the cylinder and control piston.

Means is provided to withdraw wall 64 from engagement with the piston rod 66 to permit retraction of the latter. To this end there is pivoted to a shelf 91 on member 130 a lever 88. Lever 88 is pivoted at 88a as shown at Fig. 17 of the drawing. It is provided with a pair of spaced fingers 88a and 88c. On lever 88 is a pin 88e connected by a spring 92 to a pin 91a on shelf 91. Pivoted to lever 88 is a lever 87 having one end adapted to be engaged by the heel 36a of plate 36 when the latter is pivoted in a clockwise direction looking at Fig. 11 due to retraction of piston 137 toward plug 20a.

Figure 16:
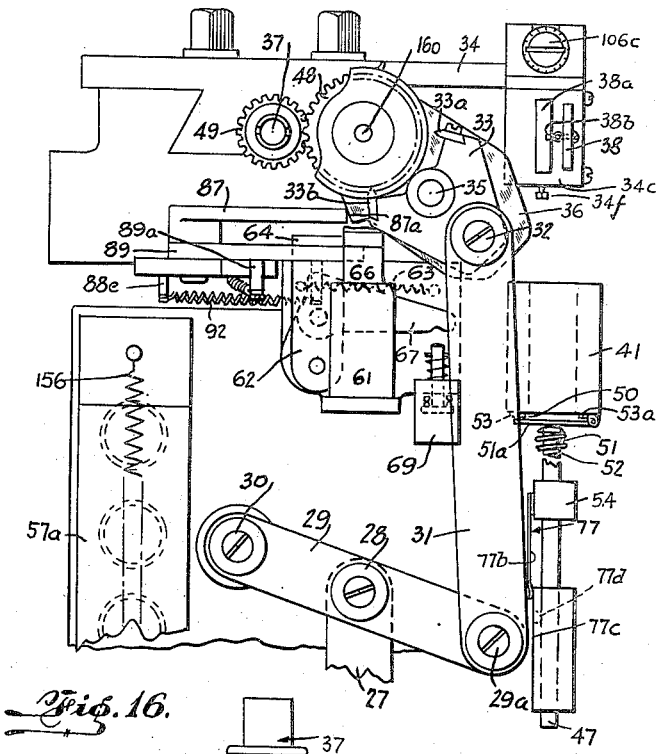
Fig. 16 is a partial top plan view showing the position of the parts when the cutting tool is being raised after the cutting stroke.

Contact of the heel 36a of plate 36 moves lever 87 to the left looking at Figs. 11 and 16, to thereby cause counterclockwise rotation of lever 88. Pivoted to the upper end of lever 88 as at 88b (Figs. 17) is a dog 89 provided with a hook 89b at its upper end engaging lever 62. On dog 89 is a pin 89a contacting finger 88a of lever 88. Pin 89a furthermore is connected by a spring 90 with finger 88c. As lever 88 is rotated in a counter-clockwise direction, the hook 89b engages lever 62 and finger 88a engages pin 89a. The lever is thus rotated in a counterclockwise direction looking at Fig. 16 to remove wall 64 from engagement with piston rod 66. Pin 88a, however, lifts the dog 89 after the piston rod is released so as to release the dog 89 from lever 62.

Provision is made for a follower 38 to move with the tool holder 106 for movement therewith to contact the template 39.

Figure 4:
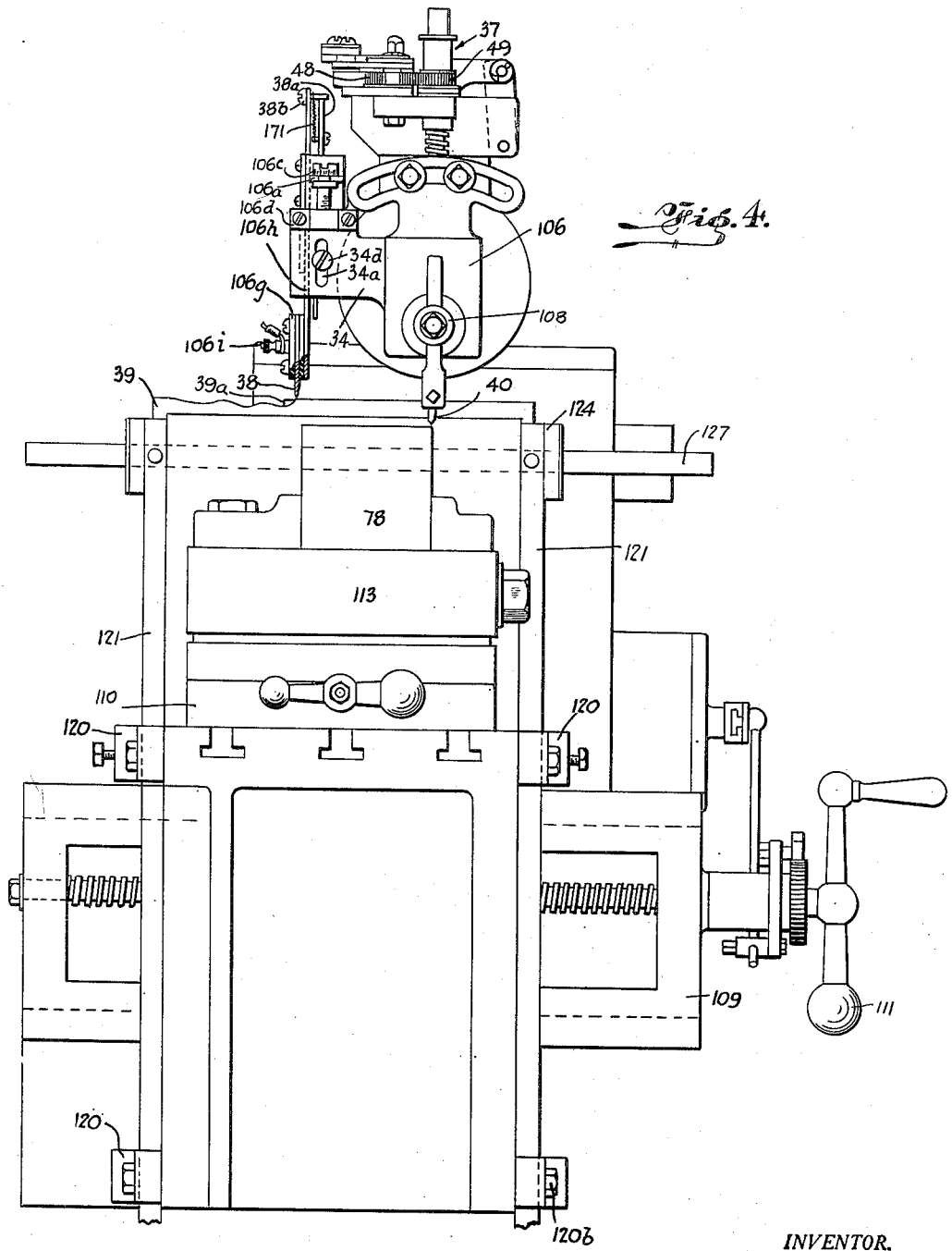
Fig. 4 is a partial front plan view of the machine embodying the invention.

To this end there is secured to the tool holder 106, as shown in Figs. 4, 9, 34, a support plate 34 which is provided with a slotted hole 34a; and on its rear surface it is provided with a vertical recess 34b receptive of a vertical slide block 34c adjustably secured to support plate 34 as by means of screw 34d which passes through the slotted hole 34a.

Slidably arranged in recesses in slide block 34c, as best seen in Fig. 34, are the follower 38 and a bar 38a. The bar 38a is vertically adjustable relative to the slide block 34c and may be secured in adjusted position by means of the set screw 34f. Interconnecting bar 38a and the upper end of the follower 38 is a coil tension spring 171, one end of which is secured to stop pin 38b on follower 38, while its other end is secured to the bar 38a at 170 (Figs. 27, 28, 28a). This arrangement is to insure that the follower 38 may be yieldingly moved upwardly against the tension of spring 171 but it will be limited in its downward movement by having its stop pin 38b abut against and rest upon the top of bar 38a.

Pivoted to bar 38a as at 173 is a bell crank 174 whose arm 175 is interconnected by a coil tension spring 176 with a fixed pin 180 on the follower 38a. The other arm 177 of the bell crank is provided with an electric contact 178 and is movable against a fixed contact 179 insulatingly secured to said bar 38a. Fixed contact 179 is connected to wire 44 (Figs. 26, 27, 28).

The spring 176 tends to rotate the bell crank 174 in a clockwise direction for closing the contacts 178, 179. On the follower 38 is a pin 180 which engages the arm 175. When the follower 38 is spaced from the template 39 as in Fig. 27, pin 180 rotates the bell crank 174 in a counterclockwise direction to open the contacts 180, 179. When the tool post slide 106 and its associated mechanism is fed downwardly, the follower 38 contacts the template 39, as shown in Fig. 28, the movement of the follower 38 will be arrested while all of the remainder of the mechanism continues to move downwardly to cause the bell crank 174 to move away from the pin 180 permitting the spring 176 to rotate the bell crank in a clockwise direction to close the switch 178, 179. It must be understood that the difference in travel between the follower and the tool post slide is very slight, due to the long lever arm 177 and the proximity of the pin 180 to the pivot 173. In practice this difference in movement is of the order of .001 inch to move the contact 178 about .010 inch to reach contact 179. Obviously, the travel distance of contact 178 may be made adjustable by anyone skilled in the art.

The follower may be vertically adjusted relative to the cutting tool by loosening set screw 34f (Fig. 34) and moving the bar 38a with the follower 38 vertically upwardly or downwardly and then tightening the set screw.

It may be desirable to make further fine micrometric adjustment and to that end there is affixed to support plate 34 (Fig. 33) a bracket 106d within which is threadedly received a stud 106b. The upper part of the stud is provided with a grooved headed portion with the top of the stud being tapered somewhat as shown at 106c. The tapered head may be provided with indexing marks 106e which may be related to a mark on the bracket 106a. The top 106c may also be provided with a conventional slot for the reception of a screw driver for rotating the stud 106b. The annular groove in the top of the stud is received within a bifurcation of the horizontal leg of bracket 106a which is secured to the vertical slide block 34c. Obviously, if the screw 34d be loosened, the slide block 34c may be vertically adjusted relative to the support plate 34 by merely rotating the stud 106b. When the adjustment has been satisfactorily made, the screw 34d may again be tightened to secure the parts in adjusted position.

In Fig. 26 there is shown the wiring diagram controlling the devices described above. Mounted in any suitable position is a solenoid 41 (Figs. 8, 9, 16, 26). One side of the solenoid coil is connected by wire 44 to the follower 38 (Fig. 26). The template 39 and false template 39a are grounded as at 46. The other side of the solenoid coil 41 is connected by wire 43 to the plus side of a power supply. Thus when the follower 38 contacts the templates 39 or 39a, the circuit will be completed to energize the solenoid 41.

Connected to armature 47 of solenoid 41 is a slide bar 47a. Mounted on the end of solenoid 41 is switch 50 (Figs. 8, 9, 16, 26), which may comprise a fixed contact 53 electrically connected with the plus side of the power supply, and a movable contact 51a which is electrically connected to one side of solenoid 56. The other side of said solenoid is connected to the minus side of the power supply.

Carried on bar 47a is a block of insulating material 54 slidably mounting a pin 51 which has a beaded end 51b which is maintained normally in abutting relation with the movable contact 51a by means of the coil spring 52 which is strung on the pin 51 between the block 54 and the head 51b of the pin. The spring 52 serves to retract the armature 47 from its solenoid 41 when the solenoid is deenergized. The arrangement is such that when the spring 52 is fully expanded it permits the movable contact 51a to withdraw from the contact 53 under the influence of spring 53a to open the circuit to solenoid 56.

To insure retention of the closed circuit through solenoids 41 and 56 until the various functions have been performed, i. e., to avoid the possibility of the circuit being broken or interrupted by the interposition of oil or dirt or other foreign matter between follower 38 and the template 39 in the one form of the invention, or between the switch contacts 178–179 in the modified form (Figs. 27–28), there is provided a current holding switch 77. This switch comprises the spring arm 77b which is carried by the block 54, electrically connected with the follower 38 and the fixed plate 77c which is electrically grounded at 46. When the bar 47 is in its normal retracted position, the free end of spring arm 77b rests upon an insulated plug 77d which is set in the plate 77c. The solenoid 56, as described above, controls the armature 57 which is connected to the slide 57a which in turn controls the valves 22, 58, 59 and 60. The exhaust valve 55 is provided with a stem 55a. When the stem is normally extended the valve is closed. When the valve stem 55a is depressed as in Fig. 16, the valve opens to discharge air. Bar 47a is formed with a notch 47b to normally receive the stem 55a, when extended. When solenoid 41 is energized and bar 47a moves to the right as shown in Fig. 16, the valve stem 55a will be depressed to open the discharge valve 55 and at the same time to lose the contacts 51a, 53 which together comprise the switch 50.

Opposed to contact 77b is the contact 77c connected to the ground 46. When the bar 47 moves to the right, contact 77b engages contact 77c to close switch 77.

Means is further provided to actuate the switch 69. To this end there is pivoted as at 68 to the frame (Figs. 16, 17, 26), a lever 67. The free end of the lever 67 operates to depress switch 69 to open the same. The pin 62a of arm 62 is adapted to engage the heel of lever 67 when lever 62 rotates in a clockwise direction looking at Fig. 16 to bring wall 64 into the path of the piston rod 66.

The operation of the device will now be described:

Consider the shaper in the position with the head nearly all the way back ½" or less, before the end of the stroke before it reverses to come forward. As the head moves back toward the end of the stroke (see Figs. 8, 9, 18, 19), the tongue 10 of lever 11 will contact the roller 12 which is fixed in the path of movement of the tongue 10 (Fig. 19), and the lever 11 will be moved backward, pushing with it the link 13 to tip the lever 14 on its pivot 15 to depress the valve stem 16 (Fig. 21) by riding over the lever 17 pivoted to the bracket 18 on the valve 19. The valve 19 being open will admit air to the back end of the cylinder 20 to force the piston in the opposite direction. When the valve 19 has opened, air is permitted to pass into the piping 21 through the valve 22 which is normally open, (Fig. 25), thence through the piping 23 into branch pipes 24 and into the cylinder 20. The piston within the cylinder is double-headed, the intermediate portion thereof having an arm 25 (Fig. 13) extending therefrom through a slot 26 in the cylinder wall.

As seen in Figs. 8, 10, 11, 12, 14 and 16, the pivotal movement of dog 33 causes the tool feed screw mechanism 37 for the shaper tool post to move down and upwardly as hereinafter further more particularly described. The linkage already described is now in position shown in Fig. 16 with the tooth 33b of the dog 33 engaged between the teeth of gear 48.

When the air was admitted to the back of the piston, the various linkage caused the dog 33 to swing on its pivot so that its tooth 33a will engage the teeth of the gear 48 which are in mesh with pinion 49 keyed or otherwise secured to the feed screw spindle 37 to move feed screw 37 downwardly until an electric contact member or follower 38 reaches or touches the template 39, thus closing electric circuit to prevent further downward feed of the tool. It is understood that the tool slide and associate mechanism and the follower 38 are mounted for vertical movement in unison, adjustment being made for the "bite" of the tool between the ends of the follower 38 and the tool 40, through the dial screw 106b, which permits independent adjustment of the follower from the tool holder and the tool 40. As contact is made between the follower 38 and the template 39, circuit is closed to energize solenoid 41.

The current from the house current source (Fig. 26) will pass through conductor 43, through solenoid 41, through conductor 44 to the follower 38, through template 39, conductor 45, to the ground 46. When the solenoid 41 is energized, the armature 47 is sucked inwardly in the direction of the arrow, as seen in Fig. 26. Simultaneously, the switch 50 is closed by reason of the slidable rod 51 contacting one arm 52 of the switch to press it in contact 53. The slidable rod 51 is mounted for sliding movement in bracket 54, mounted on slide 47a which is connected to the solenoid armature. Likewise, the slide moving forward, will depress the stem of the discharge valve 55, thus opening the valve to permit the escape of air from the cylinder 20. At the same time, when the switch 50 had been closed, the circuit was closed to solenoid 56, thus sucked in its core or armature 57, and pulling with it the slide 57a. The movement of the slide 57a toward the right as seen in Fig. 5, moves the button 22b off of the valve stem 22a of valve 22, allowing the valve stem to rise under the influence of the spring (not shown), and thus to close the valve 22 and hence to cut off the supply of air passing into the end 20a of the cylinder 20. As the slide 57a moves in the direction of the arrow to release the valve stem 22a (Fig. 5), it simultaneously depresses the valve stem 58a (Fig. 7), to open the valve 58 to allow a shot of air to pass into the other end 20b of the cylinder 20. This is for the purpose of relieving the forward pressure on the dog 33. Also at the same time, the button 60b rides off the valve stem 60a of valve 60, closing the latter valve and preventing the air that passes through the valve 58 to 20b from escaping through the main valve 80 which is open to the atmosphere. Now as the slide 57a continues the move to the right, as seen in Fig. 5, the button 59b reaches and depresses the valve stem 59a of valve 59 (Fig. 6), thus opening this valve. When the slide 57 is drawn forward to the right in the direction of the arrow, we have the condition of the valves as diagrammatically illustrated in Fig. 24, with the valves 60, 59, and 22 all closed, and with valve 58 open.

Figure 22:
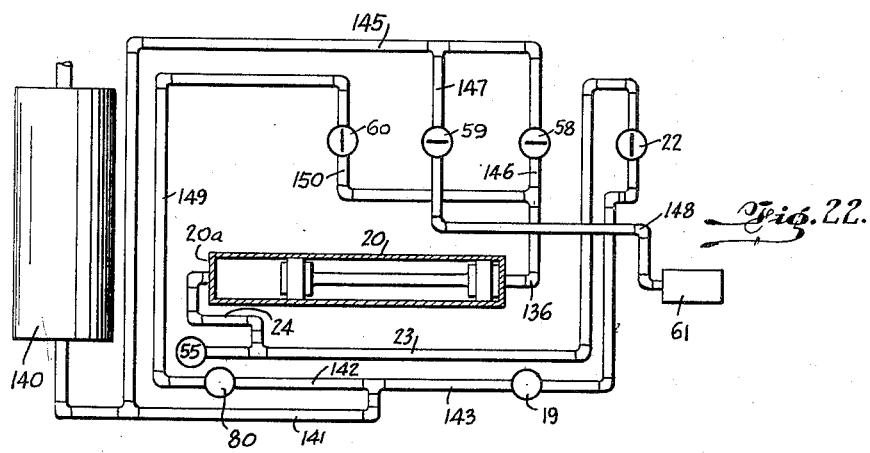
Fig. 22 is a diagrammatic view illustrating the air control system and showing the position of the parts when the head is being retracted.
Figures 23, 24:
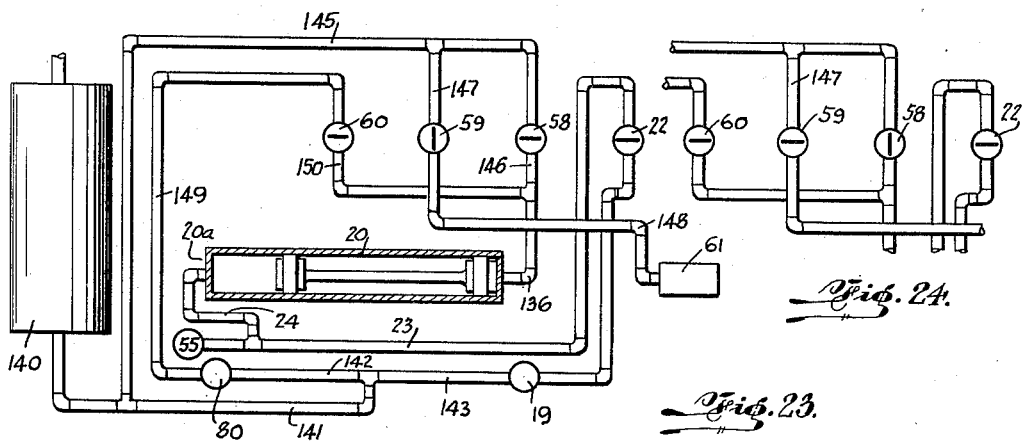
Fig. 23 is a view similar to Fig. 22 but showing the valves corresponding to the position of Fig. 6.
Fig. 24 is a partial view of the valve corresponding to the position of Fig. 7.
Figure 25:
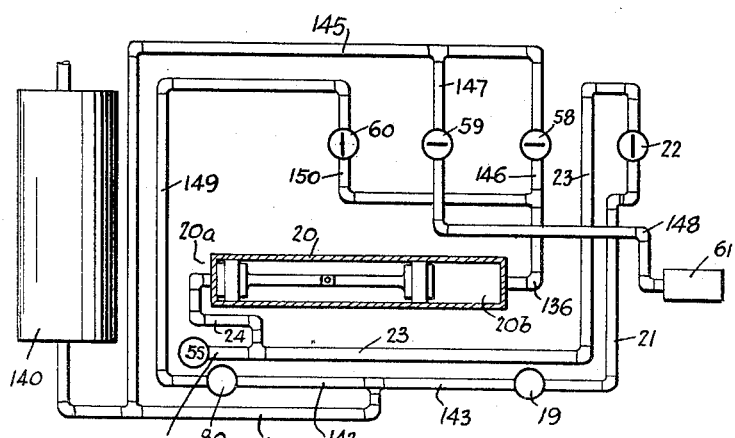
Fig. 25 is a view similar to Fig. 22 but showing the position of the valves corresponding to the positions thereof as illustrated in Fig. 5.

Valve 59, when it is open, allows air to pass from the supply to the end 61a of cylinder 61 to move the piston within the cylinder to the right (Figs. 22, 23, 25). The pivot arm or member 62 (Figs. 8, 16, 17) was permitted to swing under the influence of the spring 63 to interpose its vertical ear 64 back of the shoulder 65 of the piston rod 66 (Fig. 10) to prevent the return of the piston until the occurrence of a later event. The arm 62 has a downwardly extending pin 62a. As the arm 62 is swung, the pin 62a (Fig. 17) engages the heel of a lever 67 which is pivoted at 68 to the frame of the machine. The free end of the lever 67 operates to depress a switch 69 to open the same.

As before described, the piston rod 66 has on its free end a flattened extension 70, through which is elongated perforation or aperture 71. The underside of the extension 70 carries an annular shouldered portion 72 which extends into the opening 73a of the arm 73. That is the arm 73 pivots on the annulus 72. Now as the piston rod 66a was moved outwardly, the flattened portion 70 moved with it the end 73b of the arm 73, so as to swing the arm on its pivot 74. The pivot 74 extends through the slot 73c. Now as the arm 73 is swung, the tine 73d will be moved downwardly, as seen in Fig. 10, to contact the pin 32 and move the double-toothed dog 33 to disengage the tooth 33a from the teeth of the gear 48. The arm 73 has another furcation or tine 73e, the purpose of which will later appear.

Figure 8:
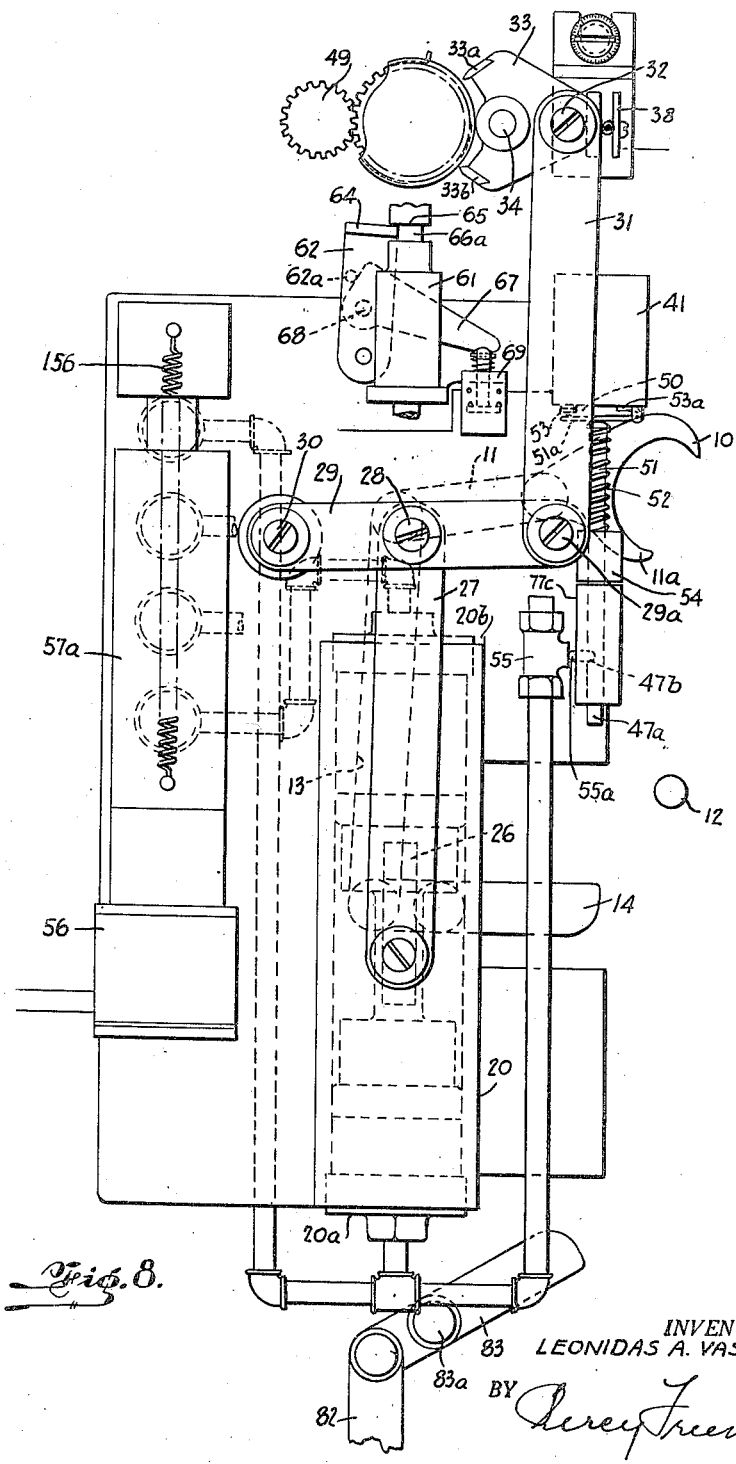
Fig. 8 is a partial top plan view of the shaper embodying the invention.

When the switch 69 was opened, the electric connection to the follower 38 was broken permitting the spring 75 to return the armature and the slide 47 to initial position, and thus open the switch 50. It will be noted that as the slide 47 moves backward it will permit the stem 55a of the valve 55 to re-enter the depression 47b in the plunger 47a, thus to close the valve 55 (Figs. 8 and 26). When the circuit is broken at the switch 50, the current was cut off from the solenoid 56, thus allowing the slide 57a to be pulled back under the influence of the spring 156 to its initial position (Fig. 8), permitting the air passing through valve 58 to move the piston in the cylinder 20 to the end of its stroke, that is toward the end 20b. It will be understood, however, that as this piston moves to complete its stroke, the double-toothed dog 35 is in neutral position (Figs. 10, 12), that is it is completely disengaged from the feed gear 48 and is carried to the end of the stroke together with the plate 36 and its associated mechanism. On its return movement, it restores all valves to their initial position, and is now in the position shown in Fig. 5 of the drawing.

The shaper slide has now come off dead center and begins to move forwardly so that the tool 40 can make a cut on the work 78. As the shaper slide is progressing forwardly, the rear tongue 11a is contacted by the roller 12, thus restoring the linkage to original position and operating the valve 19 to close the supply line and to open the exhaust of the air from the end 20a of the cylinder. It will be recollected that valves 19 and 80 are two-way valves which allow for air to enter from the supply line to the cylinder when they are open, and discharge air from the cylinder to the atmosphere when they are closed.

As the shaper slide nears the forward end of its cutting stroke, the tongue 79a of lever 79 contacts the abutment roller 81 (Fig. 29) so as to turn the lever 79 upon its pivot 79b which pulls the link 82 to rotate the lever 83 upon its pivot 83a to depress the valve stem 80a by riding over the lever 84 pivoted to the bracket 85 on the valve 80. The valve 80 is now opened, and this will admit air from the supply line to the front end 20b of the cylinder 20, to force the piston in the backward direction.

The valve 58 is normally open, which allows air to come through from the supply, as shown in Fig. 24.

As the linkage is restored to initial position, it will be understood that the link 31 turns the dog 33 on its pivot pin 35 so that the tooth 33b rides on the wall 86a of the guard 86, Fig. 12; but since the dog cannot turn any further on its own pivot, further movement of the link 31 must rotate the plate 36 with all of its associated mechanism, except that the guard 86 remains relatively stationary until the tooth 33b rides off of the wall 86a and enters the space between the teeth of the feed gear 48 (see Fig. 16). Thus it rotates the gear 48 which in turn rotates the pinion 49 to turn the feed screw 37 backwards to raise the tool slide 106 with the cutting tool and the follower 38. It will be understood, of course, that by that time the cutting stroke has been completed and the tool 40 has gone beyond the work 78.

Now when the tooth 33b reached the end of the wall 86a the dog 33 was again free to rotate on its own pivot 35 to enter the tooth 33b between the gear teeth. This last movement, however, of the dog 33 also carried the pivot pin 32 away from tongue 73d and until it contacted tine 73e and further rotation of dog 33 will carry with it the arm 73, to leave the dog 33 free to rotate on its own pivot in the opposite direction when necessary.

When the tooth 33b has engaged the gear teeth of gear 48 and starts to rotate the gear, it will eventually come in contact with the edge of the wall 86b of the guard, so as to carry the guard around with it, so as to finally expose sufficient teeth on the gear 48 on the opposite side of the wall 86a for the return feed stroke. The purpose for the wall 86 and for the necessity for having the tooth 33b ride on that wall is so as to prevent the tooth 33b from entering gear teeth 48 except insofar as we have previously adjusted the guard to move the number of teeth for elevating the tool to the desired amount. That is to say, it is desirable, in fact, necessary, to raise the tool to a lesser extent than the maximum projection or movement of the tool downwardly.

When the plate 36 has reached the limit of its movement, its edge 36a will engage the end 87a of lever 87, so as to disengage the vertical ear 64 from behind the shoulder 65 of the piston rod 66 to permit the piston 66 to return into the cylinder under the influence of the spring 66c (see Figs. 11 and 16). The valve 59 is also a two-way valve which can be opened to admit air under pressure or closed against the supply, to discharge air from the cylinder, so that as the valve is operated to cut off the supply of air, the discharge is simultaneously opened.

When the lever 87 was pushed by the plate 36 (Figs. 16, 17), it swung the arm 88 upon its pivot 88d and since the hook 89 is carried by the arm 88, the hook likewise was moved and it pulled the member 62. After the vertical ear 64 has been moved out from the shoulder 65 (Figs. 11, 16), the hook 89 was then caused to ride over the member 62 to completely free itself therefrom so as to leave the member 62 free to move back and rest against the piston rod 66. Also, it should be noted that when the vertical ear 64 is moved out from under the shoulder 65 of the piston rod, the switch 69 was freed so as to close. This switch 69 is merely a cut off switch and performs no function when it closes, except in combination with the other elements of the electric circuit.

The piston in cylinder 20 is now returned to its initial position at the end 20a of the cylinder 20 (Fig. 13), and the shaper slide is now ready to make its return stroke to repeat the cycle.

Figure 3:
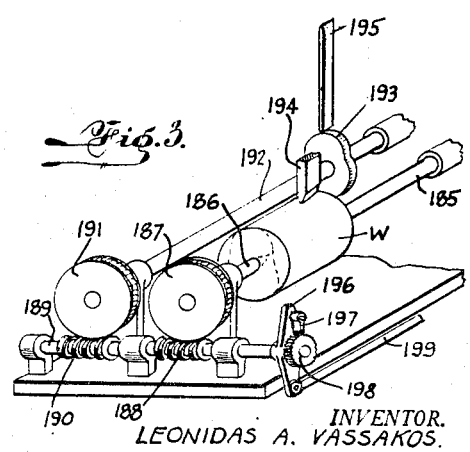
Fig. 3 is a perspective view illustrating a modified construction.

In Fig. 3 there is shown a modification for cutting round stock as for instance cams. The work piece W in Fig. 3 is clamped between shafts 185, 186. On shaft 186 is a worm gear 187 meshing with a worm 188 on shaft 189. On shaft 189 is a second worm 190 meshing with a worm gear 191 on a shaft 192 parallel to the shafts 185, 186. On shafts 192 is a template 193. The work piece W is to be cut by tool 194 in accordance with the shape of the template 193. The follower 195 is provided to contact the template 193. The follower 195 is attached to the tool post for movement therewith. The follower and tool post are connected to the head 104 in the same way as in the machine S. To rotate the shafts 185, 186 and shaft 192, in equiangular increments, there is slidably mounted on shaft 189 a cross arm 196 carrying a pawl 197. The pawl 197 engages a ratchet 198 on shaft 189. Connected to arm 196 is a link 199. The link 199 is substituted for the link 112 in Fig. 1 so as to be reciprocated as previously described. As the link reciprocates, worm 189 will be rotated through equiangular increments for rotating the work piece and the template. The rotation of the work piece and the cam corresponds to the transverse step-by-step movement of the work table 110 and the template 39 mounted thereon. It will now be seen that in the modification of Fig. 3, the link is attached to the worm shaft as seen in the drawing and is provided with a dog and intermediate feed mechanism for rotating both the template and the work. In this case the work and template do not progress transversely of the tool but rotate relative to the tool, and the template likewise rotates relative to the follower. When it is desired to use the modification shown in Fig. 3, the work-holding device or clamping means is removed and the mechanism shown in Fig. 3 is substituted.

It should be understood that all of the valves 22, 58, 59, 60 and 55, and also the solenoid 56, are used only for the purpose of causing operation of the main valves 80 and 19. Obviously, anyone skilled in the art may use other means to accomplish this same purpose; for instance, a system of links and levers may be used to operate the main valves 80 and 19 instead of the valves 22, 58, 59, 60, 55 and the solenoid 56.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, what I claim as new and desire to secure by Letters Patent, is:

1. In a machine tool of the character described, a work table, a template near the work table, a reciprocating head, a tool holder on the head, a feed screw mechanism for said tool holder, a cylinder on said head, a piston within said cylinder, means controlled by movement of the head toward the end of its return stroke for admitting fluid under pressure to one end of the cylinder for moving the piston in one direction, means controlled by movement of the piston in said direction to actuate the feed screw mechanism for moving a tool on the tool holder downwardly toward the work table a predetermined maximum distance, and means movable with the tool holder and controlled by the template on the work table to stop the downward movement of the feed screw before said maximum distance is reached.

2. In a machine tool of the character described, a work table, a template on the work table, a reciprocating head, a tool holder on the head, a feed screw mechanism for said tool holder, a cylinder on said head, a piston within said cylinder, means controlled by movement of the head toward the end of its return stroke for admitting fluid under pressure to one end of the cylinder for moving the piston in one direction, means controlled by movement of the piston in said direction to actuate the feed screw mechanism for moving a tool on the tool holder downwardly toward the work table a predetermined maximum distance.

3. In a machine tool of the character described, a work table, a template on the work table, a reciprocating head, a tool holder on the head, a feed screw mechanism for said tool holder, a cylinder on said head, a piston within said cylinder, means controlled by movement of the head toward the end of its return stroke for admitting fluid under pressure to one end of the cylinder for moving the piston in one direction, means controlled by movement of the piston in said direction to actuate the feed screw mechanism for moving a tool on the tool holder downwardly toward the work table a predetermined maximum distance, means movable with the tool holder and controlled by the template on the work table to stop the downward movement of the feed screw before said maximum distance is reached, and means controlled by movement of the head toward the end of its cutting stroke for admitting fluid under pressure to the opposite end of said cylinder for moving said piston in an opposite direction, and means controlled by movement of said piston in said opposite direction for turning the feed screw mechanism in a direction for raising the tool holder a predetermined distance.

4. In a machine tool of the character described, a work table, a template on the work table, a reciprocating head, a tool holder on the head, a feed screw mechanism for said tool holder, a cylinder on said head, a piston within said cylinder, means controlled by movement of the head toward the end of its return stroke for admitting fluid under pressure to one end of the cylinder for moving the piston in one direction, means controlled by movement of the piston in said direction to actuate the feed screw mechanism for moving a tool on the tool holder downwardly toward the work table a predetermined maximum distance, and means controlled by movement of the head toward the end of its cutting stroke for admitting fluid under pressure to the opposite end of said cylinder for moving said piston in an opposite direction, and means controlled by movement of said piston in said opposite direction for turning the feed screw mechanism in a direction for raising the tool holder a predetermined distance.

5. In a machine tool of the character described, a work table, a template on the work table, a reciprocating head, a tool holder on the head, feed screw mechanism for the tool holder, a cylinder on the head, a piston within said cylinder, means to rotate the feed screw mechanism including a gear, a double-toothed dog having a pair of teeth adapted to selectively engage the gear, means connecting the piston with said dog, and adapted to engage a tooth of the dog with the gear upon moving the piston in one direction within said cylinder, a follower movable with said tool holder and adapted to engage the template.

6. In a machine tool of the character described, a work table, a template on the work table, a reciprocating head, a tool holder on the head, feed screw mechanism for the tool holder, a cylinder on the head, a piston within said cylinder, means to rotate the feed screw mechanism including a gear, a double-toothed dog having a pair of teeth adapted to selectively engage the gear, means connecting the piston with said dog, and adapted to engage a tooth of the dog with the gear upon moving the piston in one direction within said cylinder, a follower movable with said tool holder and adapted to engage the template, means controlled by movement of the reciprocating head to admit air into one end of the cylinder for moving said piston in said direction.

7. In a machine tool of the character described, a work table, a template on the work table, a reciprocating head, a tool holder on the head, feed screw mechanism for the tool holder, a cylinder on the head, a piston within said cylinder, means to rotate the feed screw mechanism including a gear, a double-toothed dog having a pair of teeth adapted to selectively engage the gear, means connecting the piston with said dog, and adapted to engage a tooth of the dog with the gear upon moving the piston in one direction within said cylinder, a follower movable with said tool holder and adapted to engage the template, means controlled by movement of the reciprocating head to admit air into one end of the cylinder for moving said piston in said direction, and means controlled by engagement of the follower with said template to momentarily admit air to the opposite end of the cylinder to kick the piston and cause disengagement of the dog with said gear.

8. In a machine tool of the character described, a work table, a template on the work table, a reciprocating head, a tool holder on the head, feed screw mechanism for the tool holder, a cylinder on the head, a piston within said cylinder, means to rotate the feed screw mechanism including a gear, a double-toothed dog having a pair of teeth adapted to selectively engage the gear, means connecting the piston with said dog, and adapted to engage a tooth of the dog with the gear upon moving the piston in one direction within said cylinder, a follower movable with said tool holder and adapted to engage the template, means controlled by movement of the reciprocating head to admit air into one end of the cylinder for moving said piston in said direction, means controlled by engagement of the follower with said template to momentarily admit air to the opposite end of the cylinder to kick the piston and cause disengagement of the dog with said gear, and means to thereafter again admit air to the first end of the said cylinder to permit the piston to continue its movement in the first direction without said dog roating said gear.

9. In a machine tool of the character described, a work table, a template on the work table, a reciprocating head, a tool holder on the head, feed screw mechanism for the tool holder, a cylinder on the head, a piston within said cylinder, means to rotate the feed screw mechanism including a gear, a double-toothed dog having a pair of teeth adapted to selectively engage the gear, means connecting the piston with said dog, and adapted to engage a tooth of the dog with the gear upon moving the piston in one direction within said cylinder, a follower movable with said tool holder and adapted to engage the template, means controlled by movement of the reciprocating head to admit air into one end of the cylinder for moving said piston in said direction, means controlled by engagement of the follower with said template to momentarily admit air to the opposite end of the cylinder to kick the piston and cause disengagement of the dog with said gear, means to thereafter again admit air to the first end of the said cylinder to permit the piston to continue its movement in the first direction without said dog rotating said gear, and means controlled by movement of the reciprocating head to thereafter again admit air to the opposite end of the cylinder to cause the piston to move in an opposite direction for rotating the dog in an opposite direction and engage a tooth of said dog with said gear for rotating said gear in an opposite direction.

10. In a shaper, a reciprocating head, a work table, a template near the work table, a tool holder on said head, feed screw mechanism for said tool holder, means to actuate said feed screw mechanism, including an oscillating dog, a cylinder on said head, a piston within said cylinder, means connecting said piston with said dog, means to supply fluid under pressure to opposite ends of the cylinder, a pair of valves to control said supply to the opposite ends of the cylinder respectively, means on said head to actuate said valves, additional valves to control the supply of fluid to opposite ends of the cylinder, a follower movable with the tool holder, and means controlled by the engagement of the follower with the template to actuate said additional valves.

11. In a shaper, a reciprocating head, a work table, a template near the work table, a tool holder on said head, feed screw mechanism for said tool holder, means to actuate said feed screw mechanism, including an oscillating dog, a cylinder on said head, a piston within said cylinder, means connecting said piston with said dog, means to supply fluid under pressure to opposite ends of the cylinder, a pair of valves to control said supply to the opposite ends of the cylinder respectively, means on said head to actuate said valves, additional valves to control the supply of fluid to opposite ends of the cylinder, a follower movable with the tool holder, means controlled by the engagement of the follower with the template to actuate said additional valves, means to render the dog inoperative for actuating the feed screw mechanism while permitting movement of the dog, and means controlled by the engagement of the follower with said template, (the means) for rendering the dog inoperative.

12. In a shaper, a work table, a reciprocating head, a tool holder carried by said head, a feed screw mechanism for raising and lowering said tool holder, means to operate the feed screw mechanism, a template having the contour of the shape intended for the finished work, a follower movable with said tool holder and adapted to engage the template, a false template adjacent the template and adapted to block off or mask successive lower portions of the template and also contactable by the follower, said template and false template together cooperating to control the lowering of the tool holder to cause a cutting of work on the work table in successive parallel levels, said false template being movable step-by-step with respect to the template to expose successive levels of said template to contact by the follower.

13. In a machine tool for reproducing on a work piece the contour of a template, a template having the contour of the shape intended for the finished work, a follower movable with said tool holder and adapted to engage the template, a false template adjacent the template and adapted to block off or mask successive lower portions of the template and also contactable by the follower, said template and false template together cooperating to control the lowering of the tool holder to cause a cutting of work on the work table in successive parallel levels, said false template being movable step-by-step with respect to the template to expose successive levels of said template to contact by the follower.

LEONIDAS A. VASSAKOS.

(References on following page)

REFERENCES CITED

The following references are of record in the file of this patent:

UNITED STATES PATENTS

| Number | Name | Date |
|---|---|---|
| 260,211 | Lanman | June 27, 1882 |
| 656,795 | Steen et al. | Aug. 28, 1900 |
| 2,017,999 | West | Oct. 22, 1935 |
| 2,154,718 | Bannon | Apr. 18, 1939 |
| 2,234,775 | Parsons | Mar. 11, 1941 |
| 2,250,241 | Johansen | July 22, 1941 |
| 2,311,987 | Jackson | Feb. 23, 1943 |
| 2,349,171 | Jackson | May 16, 1944 |
| 2,357,790 | Turchan et al. | Sept. 5, 1944 |
| 2,376,405 | Turchan et al. | May 22, 1945 |